(12) United States Patent
Arana Hidalgo (10) Patent No.: US 11,377,204 B2
(45) Date of Patent: Jul. 5, 2022

(54) RETRACTABLE VORTEX GENERATOR SYSTEM FOR AN AIRCRAFT

(71) Applicant: Airbus Operations S.L., Getafe (ES)

(72) Inventor: Alberto Arana Hidalgo, Getafe (ES)

(73) Assignee: Airbus Operations S.L., Getafe (ES)

( * ) Notice: Subject to any disclaimer, the term of this patent is extended or adjusted under 35 U.S.C. 154(b) by 104 days.

(21) Appl. No.: 16/897,611

(22) Filed: Jun. 10, 2020

(65) Prior Publication Data

US 2020/0391854 A1 Dec. 17, 2020

(30) Foreign Application Priority Data

Jun. 12, 2019 (EP) .................................... 19382487

(51) Int. Cl.
*B64C 23/06* (2006.01)
*B64D 41/00* (2006.01)
*H01F 7/06* (2006.01)
*H01F 7/20* (2006.01)

(52) U.S. Cl.
CPC .............. *B64C 23/06* (2013.01); *B64D 41/00* (2013.01); *H01F 7/064* (2013.01); *H01F 7/20* (2013.01)

(58) Field of Classification Search
CPC ......... B64C 23/06; B64D 41/00; H01F 7/064; H01F 7/20
USPC ...................................................... 244/199.1
See application file for complete search history.

(56) References Cited

U.S. PATENT DOCUMENTS

| | | | |
|---|---|---|---|
| 5,156,362 A | 10/1992 | Leon | |
| 9,637,223 B1 | 5/2017 | DiCocco et al. | |
| 10,464,659 B2* | 11/2019 | Tiryaki | B64C 9/02 |
| 11,027,828 B2* | 6/2021 | Stefes | B64C 23/06 |
| 2010/0038492 A1* | 2/2010 | Sclafani | B64C 23/06 244/199.1 |
| 2011/0110777 A1* | 5/2011 | Abdallah | F03D 7/0252 416/23 |
| 2011/0229320 A1* | 9/2011 | Hancock | F03D 1/0675 416/1 |
| 2013/0009016 A1* | 1/2013 | Fox | B64C 9/24 244/204.1 |
| 2015/0064003 A1* | 3/2015 | Drobietz | F03D 7/042 416/1 |
| 2015/0090356 A1* | 4/2015 | Clingman | B64C 23/06 |
| 2016/0229526 A1 | 8/2016 | Hegenbart et al. | |
| 2017/0096214 A1 | 4/2017 | Stefes et al. | |

(Continued)

FOREIGN PATENT DOCUMENTS

| | | |
|---|---|---|
| EP | 2853486 A1 | 4/2015 |
| EP | 3053826 A1 | 8/2016 |
| KR | 101833682 B1 | 3/2018 |

OTHER PUBLICATIONS

European Search Report; priority document.

*Primary Examiner* — Brady W Frazier (74) *Attorney, Agent, or Firm* — Greer, Burns & Crain, Ltd.

(57) ABSTRACT

A retractable vortex generator system for an aircraft. The system comprises a skin, a slot arranged on the skin, a plate comprising a contour configured for energizing the boundary layer of an air current, and driving means configured for rotating the plate between a first and a second position. In the first position at least part of the contour of the plate protrudes through the slot, and in the second position the plate is retracted within the slot.

17 Claims, 4 Drawing Sheets

(56) References Cited

U.S. PATENT DOCUMENTS

2019/0300158 A1* 10/2019 Hui .......................... B64C 3/48
2020/0001973 A1* 1/2020 Bushmire ........... B64C 29/0033

* cited by examiner

RETRACTABLE VORTEX GENERATOR SYSTEM FOR AN AIRCRAFT

CROSS-REFERENCES TO RELATED APPLICATIONS

This application claims the benefit of the European patent application No. 19382487.7 filed on Jun. 12, 2019, the entire disclosures of which are incorporated herein by way of reference.

FIELD OF THE INVENTION

The present invention belongs to the field of air flow control, in particular to the field of boundary layer manipulation technology for aerodynamic surfaces by means of vortex generation. More specifically, the invention is of special relevance in the aeronautic industry for delaying separation of the boundary layer while minimizing the drag generated. Particularly, the present invention provides a retractable vortex generator system for an aircraft.

BACKGROUND OF THE INVENTION

In the aeronautic industry, vortex generators have been used for many years as passive flow control devices which are installed on an outer surface of an aerodynamic body such as an aircraft wing to delay separation of the boundary layer, thus contributing to preventing effects associated with the separation. These effects can result in reduced efficiency of lifting surfaces, or even stalling at low flight speeds and high angles of attack. Therefore, vortex generators reduce landing and take-off speed, as well as allow the wing to develop more lift, thus improving the rate of climb.

In particular, the delay in the separation of the boundary layer, is achieved due to the fact that vortex generators transport fluid with high momentum present in the upper and outer parts of the boundary layer, as vortices, down to the lower momentum zone which is closer to the aerodynamic surface. Therefore, energy is drawn from the upper and outer parts and transmitted to the lower parts which are experiencing an adverse pressure gradient which tends to separate the boundary layer from the aerodynamic surface. This way, the vortices reenergize the boundary layer, making it thinner and more resistant to the adverse pressure gradient regarding boundary layer separation Vortex generators are normally located on different critical surfaces of an aircraft, such as the horizontal and vertical stabilizer, increasing rudder efficiency, or the upper surface of the wing, as stated above. Also, one of the most common locations where the vortex generators are mounted is before the ailerons. In the event that the aircraft wing stalls, thus experiencing a sudden reduction in the lift generated, the boundary layer separates from the outer surface of the wing. Therefore, the flow detachment occurs prior to the interaction with the ailerons, what renders them ineffective. Implementation of vortex generators before the ailerons allows them to provide control of the airplane even if the rest of the wing stalls.

Regarding the mechanical implementation of vortex generators, they are normally mounted or glued directly on the aerodynamic surface of the aircraft, thus being present interfering with the airstream in all the stages of flight, even when they are not needed.

Therefore, vortex generators are only installed where potentially needed, thus avoiding unduly increasing the total drag due to their presence in all the stages of flight.

SUMMARY OF THE INVENTION

In a first inventive aspect, the invention provides a retractable vortex generator system for an aircraft, the system comprising:
a skin,
a slot arranged on the skin,
a plate comprising a contour configured for energizing the boundary layer of an air current, and
driving means configured for rotating the plate between a first and a second position,
wherein in the first position at least part of the contour of the plate protrudes through the slot, and
in the second position the plate is retracted.

In this entire document, it will be understood that the retractable vortex generator system is configured to be installed in an aerodynamic surface of an aircraft. When the system is installed on an aircraft, the skin of the system and the aerodynamic surface of the aircraft provide a clean aerodynamic surface. That is, the skin will be in line with the aerodynamic surface, providing aerodynamic continuity.

Therefore, it will be understood that, when the system is installed on an aircraft, when the plate is in the first position (A), part of the plate protrudes throughout the slot of the system in order to be in contact with the surrounding air field. In this sense, the term "above" is used to express that the plate protrudes from the slot to the outer part of the aircraft, this is, outwards from the outer surface of the aircraft.

Accordingly, when the plate is said to be retracted, it will be understood that no part of the plate is protruding outwards from the surface of the aircraft. Instead, the whole plate is housed inwards from the outer surface of the aircraft.

As stated in the previous section, traditional vortex generators (VGs) are fixed to an outer surface of an aircraft, such as the wing, normally by means of an adhesive bonding, thus generating an undesirable drag in all stages of flight, having an especially adverse impact in those stages wherein vortex generation is not needed.

Therefore, a retractable vortex generator system according to the present invention provides the beneficial effects of VGs, such as reducing the stall speed and increasing the critical angle of attack, while avoiding the unwanted drag when they are retracted within the aircraft outer surface.

Further, as stated above, traditional VGs provide passive flow control, as once they are fixed onto a surface, they cannot be actuated by any means. Advantageously, a retractable vortex generator system according to the first inventive aspect provides active control of the boundary layer, as it is described hereinbelow.

When designing VGs, as well as when planning their installation and location in a particular aerodynamic surface, a number of critical parameters must be considered. Regarding geometry, the shape, height and length of VGs are of prime importance. Regarding their location, for example in an aircraft wing, chordwise positioning and spanwise spacing must be carefully dealt with, as for a given point in the post-stall region, VGs would only be effective if positioned in front of the separation line. Typically, VGs should be placed before the transition point from laminar to turbulent flow. However, locating the VGs too close to the leading edge would greatly increase drag at lower angles of attack.

The retractable vortex generator system provides a plate with a predetermined shape that protrudes through a slot out of the aircraft outer surface, introducing the plate within the surrounding air field for generating microscopic vortices. The shape thus conditions the nature of the vortices as well as the amount of drag generated. Advantageously, as the geometry of the plate is not conditioned by the fact of being exposed to the air field in all stages of flight, which occurs with the VGs of the state of the art, the retractable capabilities provided by the system according to the present invention allow the plates to be provided with any geometry suitable for an specific purpose which otherwise would be disregarded.

Advantageously, combined geometries (rectangular, triangular or parabolic, among others) suitable for different flight conditions can be designed, as the driving means can make only a part of the plate to protrude through the slot out of the aircraft surface. In an exemplary embodiment, the contour of the plate can have a first semicircular leading edge, which, when the plate is further rotated by the driving means, moves backward making way for a rectangular leading edge.

Further, the boundary layer thickness is also required for sizing the VGs. As VGs manipulate and control the boundary layer, it is desirable that they are always inside it. Further, the portion of VG protruding above the boundary layer would prove ineffective for providing flow control, while unduly increasing total drag.

On general aviation aircraft, VGs height is typically around a value of 80% of the laminar boundary layer before the theoretical transition point from laminar to turbulent flow.

As the boundary layer thickness may vary depending on the flight conditions, a retractable vortex generator system with height adjustment capabilities proves advantageous regarding fixed passive VGs. By rotating the plate of the present invention, the part of the plate protruding through the slot out of the aerodynamic surface can be adjusted, thus ensuring that the VGs are kept within the boundary layer.

Analogously, the effective length of the part of plate protruding out of the slot can be adjusted. That is, by rotating the plate, the size of the part of the plate protruding out of the slot can be controlled, thus increasing the distance between the leading edge and trailing edge.

Regarding the location of the system on any particular aerodynamic surface of an aircraft, traditional VGs are bonded onto the surface in a fixed position. Advantageously, and in a similar manner to height and length adjustment, the rotating movement capabilities of the plate, allows longitudinal displacement, along the axis of the slot, of the leading edge and the trailing edge of the plate, thus moving them both forward and backward.

As stated above, traditional VGs are regarded to be exposed to the surrounding air field in all stages of flight. Therefore, when designing an aircraft, this fact must be taken into account and dealt with. As a consequence, the implementation of traditional VGs in an aircraft is strongly conditioned due to their contribution to increasing total drag, thus trying to reduce their number, size, and locations as much as possible.

Advantageously, with a retractable vortex generator system according to the present invention, aircraft design is provided with improved design flexibility, as the use of VGs is no longer restricted by the drag caused in all stages of the flight when no vortex generation is needed.

In a particular embodiment, the contour is shaped with a substantially flat portion adapted to match with the slot when the plate is retracted within the slot in the second position, thus providing a clean aerodynamic surface along with the skin.

Advantageously, when the plate of the system is retracted within the system, below the aircraft outer surface, the contour of the plate is shaped to match the slot, closing the slot thereby. This way, the skin of the system along with the substantially flat part of the contour of the plate closes the slot providing aerodynamic continuity, this is, a clean aerodynamic surface which avoids any undesirable aerodynamic interference with the surrounding air field that may cause additional drag.

In a particular embodiment, the plate has a substantially circular shape truncated by a chord, and the chord is the portion shaped to match with the slot when the plate is in the second position.

In a particular embodiment, the system comprises a casing, wherein the plate and the driving means are at least partially housed in the casing. Advantageously, the system can be made compact, minimizing the total volume occupied, also providing improved design feasibility. Also advantageously, a compact configuration housed within a casing allows simpler implementation in an aircraft, for example in a bay of the aircraft.

In a particular embodiment, the casing comprises a plurality of holes configured for draining water. Under certain operating conditions, water may leak through the slot within the system, thus accumulating therein, what may involve a risk for the system, leading to potential harm for the rest of the elements, for example in the event that the accumulated water freezes. The water may come from different sources, for example, water that condensates in the skin of the system, or rainwater that leaks within the system during transition of the plate from one position to another, or during any other phase of the operation of the system. Advantageously, the water can be drained out of the system in order to avoid any harm to the elements of the system.

Further advantageously, draining the water that leaks trough the slot prevents the accumulation of water on the boundaries of the slot. Therefore, ice accretion is duly reduced, thus preventing the thickening of a layer of ice on the slot that may jeopardize the operation of the system. Accordingly, in the event of the appearance of a layer of ice on the slot, as the layer is not permitted to grow thicker by accumulation of water thereon, the action of the plate, when driven by the driving means from one position to another, will break the layer of ice thereby.

In a particular embodiment, the contour comprises at least a notch shaped therein. Advantageously, the contour can be shaped regarding different geometries for generating vortices in the boundary layer when the plate protrudes throughout the slot in the first position (A). In a particular embodiment the contour comprises a V notch, so that when the plate is in the first position (A), the trailing edge of the part of the plate protruding throughout the slot is essentially perpendicular to the skin of the system.

In a particular embodiment the slot comprises a seal configured for preventing solid particles from entering within the system.

In a particular embodiment, the plate comprises at least one metallic flap fixed thereon, the at least one metallic flap configured for rotating with the plate around a rotation center, and wherein the driving means comprises at least one electromagnet configured to alternate its polarity, wherein when the electromagnet has a first polarity, the at least one metallic flap abuts against the electromagnet in a first electromagnetic balance corresponding to the first position of the plate, wherein when the electromagnet has a second polarity, the at least one metallic flap abuts against the electromagnet in a second electromagnetic balance corresponding to the second position of the plate, and wherein a change of polarity of the electromagnet causes the rotation of the plate between the first and the second position.

In a particular embodiment, the driving means comprises two electromagnets configured to alternate their polarity, wherein the two electromagnets are positioned on opposite sides of the rotation center.

In a particular embodiment, the driving means comprises a motor and a gear rod mechanism, the motor being configured for mechanically actuating the gear rod mechanism for rotating the plate between the first and the second position.

In a particular embodiment, the gear rod mechanism comprises at least a first and a second rod, wherein the first rod is articulately connected to the plate, the first rod being further articulately connected to the second rod by means of a ball joint, and the second rod is further articulately connected to the motor.

In a particular embodiment, the contour of the plate comprises at least one protrusion, and the driving means comprises:

at least one movable stopping element, configured to be moved between a non-locking position and a locking position, and at least one resilient torsion element, configured to be externally actuated so as to rotate the plate in one direction while storing potential energy, wherein when the at least one movable stopping element is moved into the locking position, the at least one protrusion abuts against the at least one movable stopping element, thus releasably locking the plate in one of the first or second positions, and wherein upon movement of the movable stopping element from the locking position into the non-locking position, the plate is released, thus moving from one of the first or second positions to the other position by means of the stored potential energy.

In a particular embodiment, the at least one resilient torsion element is a first torsion spring, the driving means further comprising a second torsion spring counterbalanced with the first torsion spring.

In a particular embodiment, the driving means further comprise a plurality of electromagnets configured for actuating the first and second counterbalanced torsion springs.

Using a magnetic interface for actuating the torsion springs with magnetic means such as electromagnets provides the system with improved robustness and intrinsic safety, as the reduction of components means lower risk of sources of failure. Further, magnetic coupling allows fine tuning and better stabilization of the torsion springs, which results in a more precise control of the rotation of the plate. Also, the reduction of mechanical connections and actuators suppress the drawbacks associated with its use, such as noise, wear and unwanted vibrations, everything allows while reducing the frequency and extent of maintenance operations.

In a second inventive aspect, the invention provides an aircraft comprising a retractable vortex generation system according to an embodiment of the first inventive aspect.

BRIEF DESCRIPTION OF THE DRAWINGS

These and other characteristics and advantages of the invention will become clearly understood in view of the detailed description of the invention which becomes apparent from a preferred embodiment of the invention, given just as an example and not being limited thereto, with reference to the drawings.

DETAILED DESCRIPTION OF THE PREFERRED EMBODIMENTS

Figure 1A:
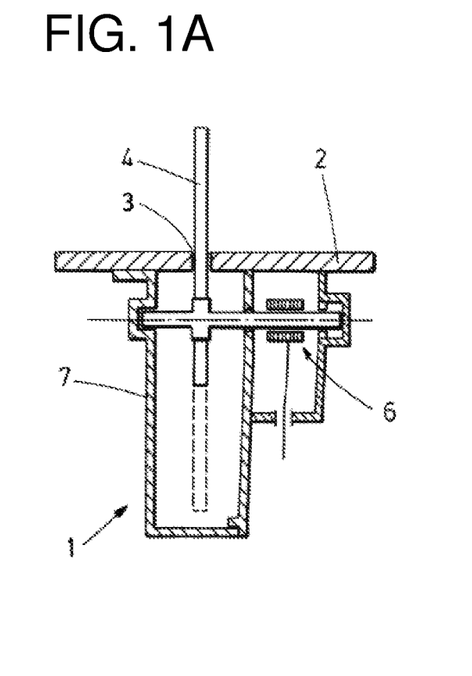
FIGS. 1A and 1B show two schematic views of a retractable vortex generator system according to an embodiment of the present invention, wherein each schematic view shows the first and the second position of the plate, respectively.
Figure 1B:
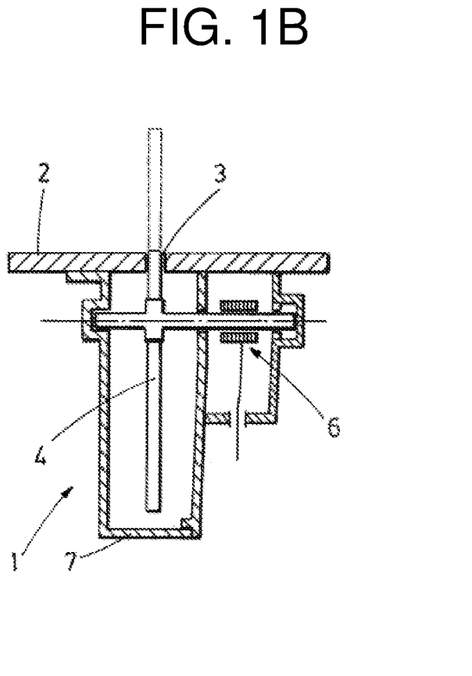
Figure 2:
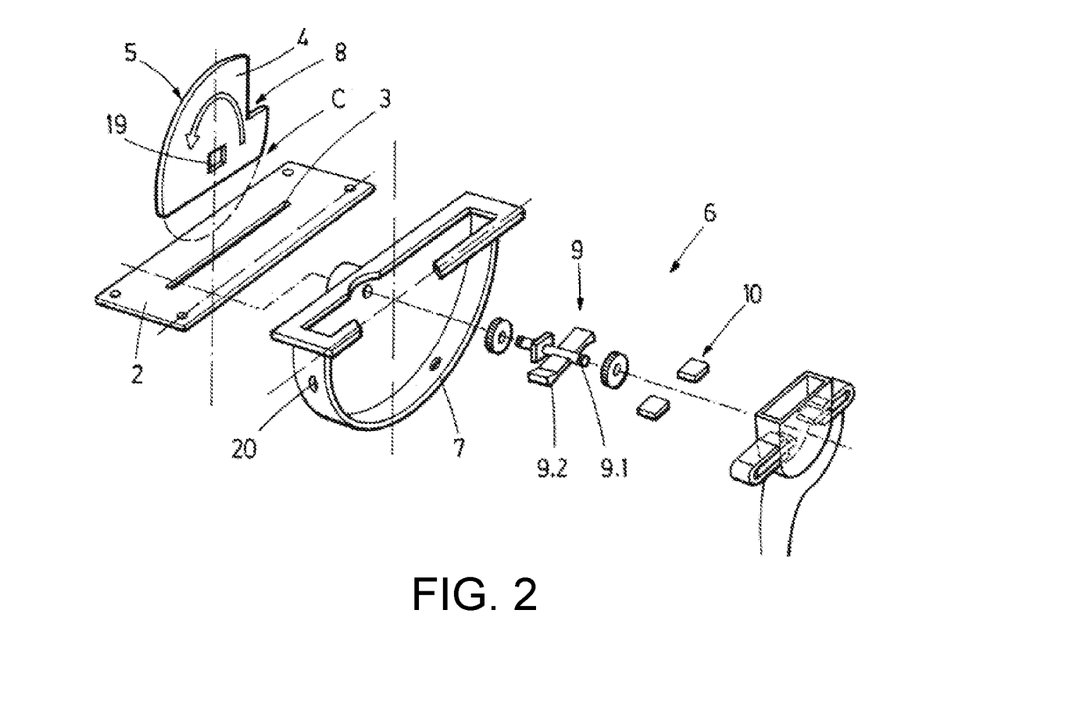
FIG. 2 shows an exploded schematic view of a retractable vortex generator system according to an embodiment of the present invention.

FIGS. 1A, 1B and 2 show schematic representations of an embodiment of the retractable vortex generation system (1) according to the present invention. In particular, FIGS. 1A and 1B show two schematic views of the system (1) corresponding to the first (1A) and the second (1B) position of the plate (4), respectively. FIG. 2 shows and exploded view of the elements of the system (1).

These figures show a skin (2), which is adapted to be connected to the external surface of an aircraft (100), being in line with the surface, once the system (1) has been implemented therein, thus providing aerodynamic continuity.

Further, the skin (2) comprises a slot (3). The slot (3) allows the plate (4) to protrude therethrough, rotated by the driving means (6), so as to stand in the way of the surrounding air flow and energize the local boundary layer, in the event that vortex generation is needed to prevent the air flow from detaching from the surface of the aircraft (100).

In FIGS. 1A and 1B, the plate (4) is represented in two possible operative positions. In the first position (1A), the plate (4) is protruding throughout the slot (3), outwards from the outer surface of the aircraft (100), so as to energize the local boundary layer of the surrounding air flow; and in the second position (1B), the plate (4) is retracted within the slot (3), thus avoiding interfering with the surrounding air flow, further avoiding causing additional drag. The plate (4) comprises a contour (5) configured to generate vortices in the surrounding air flow when the plate (4) is in the first position (1A). In this particular embodiment, the plate (4) has a substantially circular shape and is truncated by a chord (c). The chord (c) is shaped to match with the slot (3) when the plate (4) is retracted within the slot (3) in the second position (1B), thus contributing to providing a clean aerodynamic surface and preventing air from leaking within the system (1). Further, the contour (5) of the plate (4) is shown comprising a V notch (8).

Below the surface defined by both the skin (2) and the slot (3), in this embodiment the rest of the elements of the system (1) are housed within a casing (7) installed in a bay of the aircraft (100). In particular, as can be seen in FIG. 2, the casing (7) is configured as a semi-circular frame provided with holes (20) for draining water that may leak within the slot (3), entering the system (1). Also below the line defined by the skin (2) and the slot (3), the plate (4) is provided with a metallic flap (9) fixed thereon, the metallic flap (9) being configured for translating movement caused by the action of the driving means (6) into a rotational movement, thus rotating the plate (4) from one of the first position (1A) or second position (1B) to the other. The metallic flap (9) comprises a shaft (9.1) fixed protruding along an axis located in a rotation center (19) of the plate (4). Further, the metallic flap (9) is provided with two flanges (9.2) located in opposite sides of the shaft (9.1).

The driving means (6) comprises two electromagnets (10) each one arranged to be facing a respective flange (9.2) of the metallic flap (9). The driving means (6) may shift the electromagnetic polarity of the electromagnets (10). By doing so, each of the two electromagnets (10) will induce an electromagnetic reaction in their respective flanges (9.2), thus repelling or attracting the flanges (9.2) thereby. Therefore, the electromagnets (10) and flanges (9.2) can be in a first or second electromagnetic balance states, depending on the polarity of the electromagnets (10) induced by the driving means (6).

In the first electromagnetic balance, the flanges (9.2) are magnetically coupled to the electromagnets (10) in a position corresponding to the first position (1A) of the plate (4), the plate (4) protruding throughout the slot (3) outwards from the outer surface of the aircraft (100).

In the event of a polarity shift of the electromagnets (10) induced by the driving means (6), the flanges (9.2) will be moved away from the first electromagnetic balance, progressing to a second electromagnetic balance thereby, the second electromagnetic balance corresponding to the second position (1B) of the plate (4), the plate (4) being retracted within the slot (3).

Therefore, the plate (4) can be rotated both in clockwise and anti-clockwise direction, as a reaction to the polarity shift of the electromagnets (10) induced by the driving means (6), the plate (4) thus progressing from the first position (1A) to the second position (1B) or vice versa, as required depending on the flight conditions.

Figure 3A:
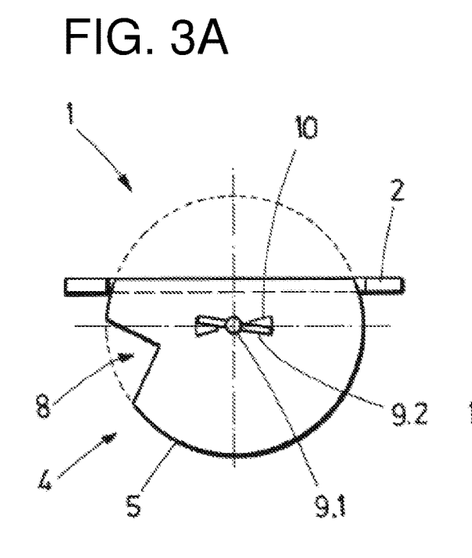
FIGS. 3A and 3B show two schematic cross-sectional views of a retractable vortex generator system according to an embodiment of the present invention, wherein each schematic view shows the first and the second position of the plate, respectively.
Figure 3B:
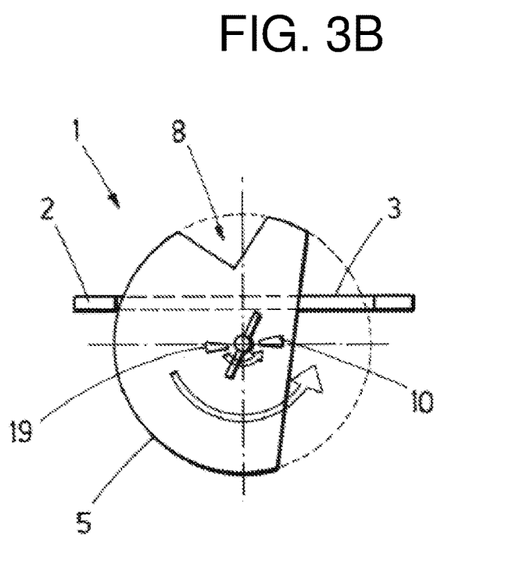

FIGS. 3A and 3B show two schematic cross-sectional views of the retractable vortex generator system (1) according to the embodiment of FIGS. 1A, 1B and 2. In particular, FIGS. 3A and 3B show the transition between the first position (3A) of the plate (4) and the second position (3B) of the plate (4), by means of a polarity shift in the electromagnets (10) comprised in the driving means (6) of this particular embodiment.

In the first position of the plate (4) shown in FIG. 3A, part of the plate (4) is protruding throughout the slot (3), outwards from the outer surface of the aircraft (100). In particular, the contour (5) of the plate (4) protruding comprises a V notch (8) shaped therein. Two circular arrows (FIG. 3B) show the direction of the movement of the plate (4). In particular, the arrows indicate that the plate (4) is being rotated in an anti-clockwise direction. Accordingly, the flanges (9.2) of the metallic flap (9) are also depicted rotating in an anti-clockwise direction. The flanges (9.2) are moving due to a polarity shift of the electromagnets (10), which forces the flanges (9.2) to move away from its previous electromagnetic balance state to another by rotating around the shaft (9.1) fixed to the rotation center (19) of the plate (4). Once the flanges (9.2) abut against the electromagnets (10), the rotation of the plate (4) stops, thus being in an electromagnetic balance corresponding to the second position (3B) of the plate (4). In this position, the contour (5) of the plate (4) is shaped to match with the slot (3), closing the slot (3) and thus contributing to providing a clean aerodynamic surface along with the skin (2) of the system (1).

It can be derived from both views that, as the rotation of the plate (4) progresses, the height and the length of the part of the plate (4) protruding out of the slot (3) decreases until it is fully retracted within the slot (3).

Figure 4:
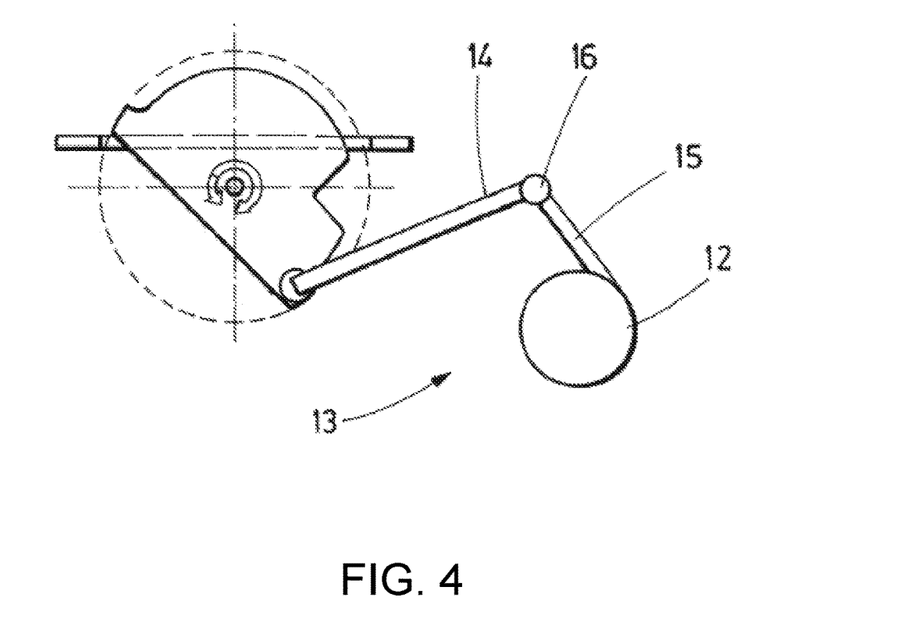
FIG. 4 shows a schematic cross-sectional view of a retractable vortex generator system according to an embodiment of the present invention, wherein the plate is connected to a motor by means of a gear-rod mechanism.

FIG. 4 shows a schematic cross-sectional view of a retractable vortex generator system (1) according to an embodiment of the present invention. In this particular embodiment, the driving means (6) comprises a motor (12) and a gear rod mechanism (13) for translating the movement of the motor (12) into a rotational movement of the plate (4), thus rotating the plate (4) from the first position (3A) into the second position (3B) and vice versa. The motor (12) is articulately connected to the plate (4) by means of the gear rod mechanism (13). In particular, the gear rod mechanism (13) comprises a first rod (14) articulately connected to the plate (4) in a connection point. Further, the first rod (14) is articulately connected with the second rod (15) by means of a ball joint (16), which allows relative rotational movement between the first rod (14) and the second rod (15). The second rod (15) is further articulately connected to the motor (12), thus being moved by the motor (12) and transmitting the motion to the first rod (14) through the ball joint (16).

Figure 5A:
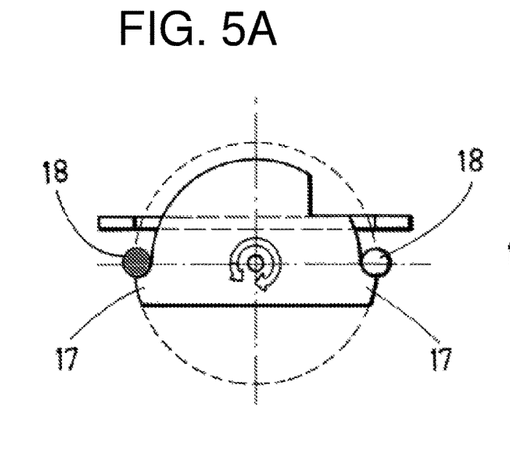
FIGS. 5A and 5B show two schematic cross-sectional views of a retractable vortex generator system according to an embodiment of the present invention, wherein each schematic view shows the first and the second position of the plate, respectively.
Figure 5B:
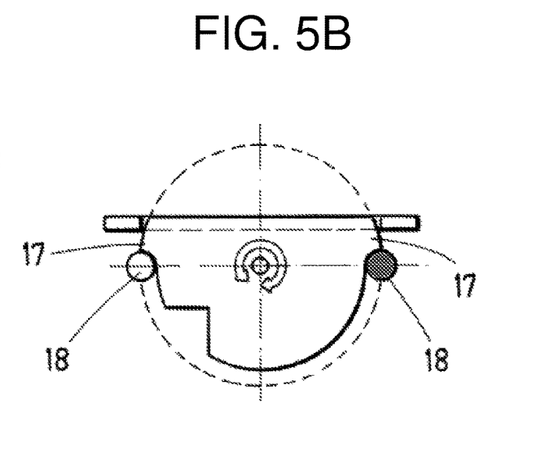

FIGS. 5A and 5B show two schematic cross-sectional views of the retractable vortex generator system (1) according to an embodiment of the present invention. In particular, FIG. 5A shows the transition between the first position of the plate (4) and FIG. 5B shows the second position of the plate (4), by means of the interaction of two built-in protrusions (17) of the plate (4) with a particular configuration of the driving means (6) which comprises two movable stopping elements (18) and a torsion spring (not shown).

By externally applying torque to the torsion spring, pure momentum is transmitted to the plate (4), thus rotating it. Therefore, the torsion spring can drive the plate (4) from one position to another, while storing elastic potential energy, which may be used afterwards to restore the plate (4) to the initial position.

The two movable stopping elements (18) are configured for moving between a locking position and a non-locking position. When in the locking position, the movable stopping elements (18) are moved for protruding out of a built-in slot, thus getting in the rotational trajectory of the protrusions (17) of the plate (4).

In this particular embodiment, in the view corresponding to the first position (5A), the torsion spring has been externally actuated to rotate the plate (4) in anti-clockwise direction, storing elastic potential energy thereby. Further, the movable stopping element (18) located on the left side of the view, is in the locking position, stopping a protrusion (17) which is abutting against it, thus blocking the plate (4) in the first position (5A). On the right side of the view, a movable stopping element (18) is in the non-locking position, thus not interfering with the rotational trajectory of the plate (4), allowing the plate (4) to rotate freely.

Upon switching of the left movable stopping element (18) into a non-locking position, the protrusion (17) is then released, thus freeing the plate (4) to progress to the second position shown in FIG. 5B by means of the elastic potential energy stored by the torsion spring. Then, the movable stopping element (18) on the right side of the view has been moved into a locking position. Therefore, when a protrusion (17) abuts with the movable stopping element (18), it is stopped, blocking the plate (4) thereby in the second position (5B).

Figure 6:
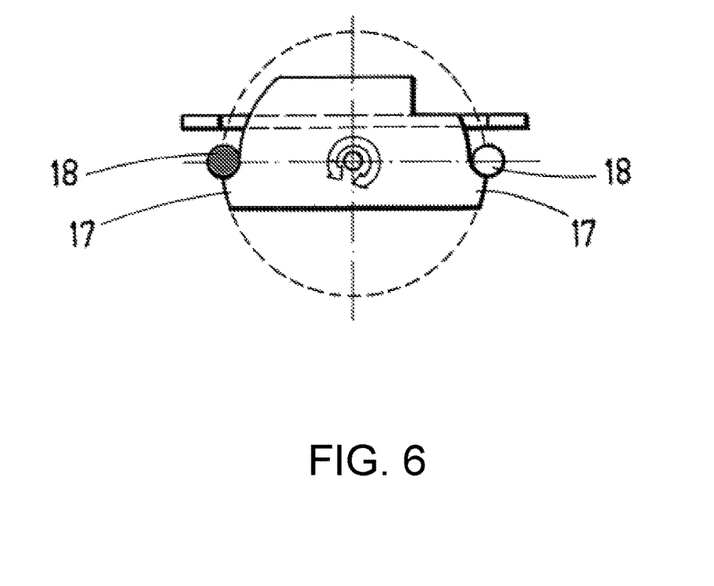
FIG. 6 shows a cross sectional view of a retractable vortex generator system according to an embodiment of the present invention, wherein the contour of the plate comprises a flat shape.

FIG. 6 shows a schematic cross-sectional view of the retractable vortex generator system (1) according to the embodiment of FIGS. 5A and 5B showing a particular shape of the contour (5) of the plate (4). In particular, the contour (5) of the plate (4) protruding throughout the slot (3) is truncated comprising a flat part which is parallel to the slot (3) when the plate (4) is protruding in the first position (5A).

Figure 7:
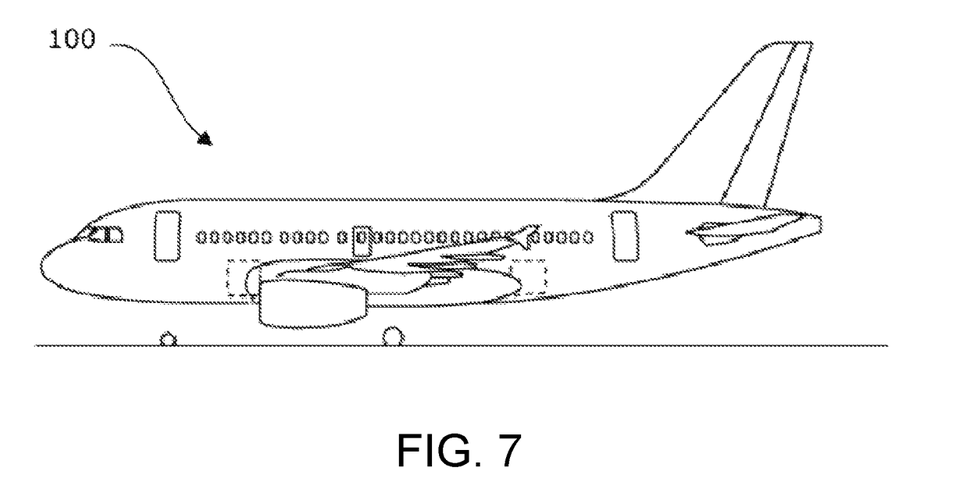
FIG. 7 shows an aircraft comprising a retractable vortex generator system.

FIG. 7 shows an aircraft (100) comprising a retractable vortex generator system (1) as shown in any of the previous figures.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A retractable vortex generator system for an aircraft, the system comprising:
   a skin,
   a slot arranged on the skin,
   a plate comprising a contour configured for energizing a boundary layer of an air current, and
   driving means configured for rotating the plate 180 degrees between a first position and a second position,
   wherein in the first position, at least part of the contour of the plate protrudes through the slot, and
   wherein in the second position, the plate is retracted.

2. The system according to claim 1, wherein the contour is shaped with a substantially flat portion adapted to match with the slot when the plate is retracted within the slot in the second position, thereby providing a clean aerodynamic surface along with the skin.

3. The system according to claim 2,
   wherein the plate has a substantially circular shape truncated by a chord, and
   wherein said chord is the portion shaped to match with the slot when the plate is in the second position.

4. The system according to claim 1, further comprising a casing, wherein the plate and the driving means are at least partially housed in the casing.

5. The system according to claim 4, wherein the casing comprises a plurality of holes configured for draining water.

6. The system according to claim 1, wherein the contour comprises at least a notch shaped therein.

7. The system according to claim 1, wherein the slot comprises a seal configured for preventing solid particles from entering within the system.

8. The system according to claim 1,
   wherein the plate comprises at least one metallic flap fixed thereon, the at least one metallic flap configured for rotating with the plate around a rotation center, and
   wherein the driving means comprises at least one electromagnet configured to alternate its polarity,
   wherein when said electromagnet has a first polarity, the at least one metallic flap abuts against the electromagnet in a first electromagnetic balance corresponding to the first position of the plate,
   wherein when said electromagnet has a second polarity, the at least one metallic flap abuts against the electromagnet in a second electromagnetic balance corresponding to the second position of the plate, and
   wherein a change of polarity of the electromagnet causes a rotation of the plate between the first and the second position.

9. The system according to claim 8,
   wherein the driving means comprises two electromagnets configured to alternate its polarity,
   wherein the two electromagnets are positioned on opposite sides of the rotation center.

10. The system according to claim 1,
    wherein the driving means comprises a motor and a gear rod mechanism,
    wherein the motor is configured for mechanically actuating the gear rod mechanism for rotating the plate between the first and the second position.

11. The system according to claim 10,
    wherein the gear rod mechanism comprises at least a first rod and a second rod,
    wherein the first rod is articulately connected to the plate, the first rod being further articulately connected to the second rod by means of a ball joint, and
    the second rod is further articulately connected to the motor.

12. The system according to claim 1,
    wherein the contour of the plate comprises at least one protrusion, and
    wherein the driving means comprises:
      at least one movable stopping element, configured to be moved between a non-locking position and a locking position, and
      at least one resilient torsion element, configured to be externally actuated so as to store potential energy to rotate the plate in one direction
    wherein when the at least one movable stopping element is moved into the locking position, the at least one protrusion abuts against the at least one movable stopping element, and
    wherein upon movement of the movable stopping element from the locking position into the non-locking position, the plate is released, thus moving via stored potential energy.

13. The system according to claim 12, wherein the at least one resilient torsion element is a first torsion spring, the driving means further comprising a second torsion spring counterbalanced with the first torsion spring.

14. The system according to claim 13, wherein the driving means further comprise a plurality of electromagnets configured for actuating the first and second counterbalanced torsion springs.

15. An aircraft comprising a retractable vortex generation system according to claim 1.

16. A retractable vortex generator system for an aircraft, the system comprising:
a skin, a slot arranged on the skin, a plate comprising a contour configured for energizing a boundary layer of an air current, and driving means configured for rotating the plate between a first position and a second position,
wherein in the first position, at least part of the contour of the plate protrudes through the slot, and
wherein in the second position, the plate is retracted
wherein the driving means comprises a motor and a gear rod mechanism,
wherein the motor is configured for mechanically actuating the gear rod mechanism for rotating the plate between the first and the second position
wherein the gear rod mechanism comprises at least a first rod and a second rod,
wherein the first rod is articulately connected to the plate, the first rod being further articulately connected to the second rod by means of a ball joint, and the second rod is further articulately connected to the motor.

17. A retractable vortex generator system for an aircraft, the system comprising:
a skin, a slot arranged on the skin, a plate comprising a contour configured for energizing a boundary layer of an air current, and driving means configured for rotating the plate between a first position and a second position,
wherein in the first position, at least part of the contour of the plate protrudes through the slot, and
wherein in the second position, the plate is retracted,
wherein the plate comprises at least one metallic flap fixed thereon, the at least one metallic flap configured for rotating with the plate around a rotation center,
wherein the driving means comprises at least one electromagnet configured to alternate its polarity,
wherein when said electromagnet has a first polarity, the at least one metallic flap abuts against the electromagnet in a first electromagnetic balance corresponding to the first position of the plate,
wherein when said electromagnet has a second polarity, the at least one metallic flap abuts against the electromagnet in a second electromagnetic balance corresponding to the second position of the plate, and
wherein a change of polarity of the electromagnet causes a rotation of the plate between the first and the second position.

* * * * *